United States Patent

South

[15] 3,654,519

[45] Apr. 4, 1972

[54] CIRCUIT BREAKER INCLUDING IMPROVED OVERCURRENT PROTECTIVE CIRCUIT

[72] Inventor: William H. South, McKeesport, Pa.

[73] Assignee: Westinghouse Electric Corporation, Pittsburgh, Pa.

[22] Filed: Feb. 18, 1971

[21] Appl. No.: 116,496

[52] U.S. Cl.....................317/36 TD, 307/293, 317/33 R, 317/38, 317/141 S
[51] Int. Cl. ....................................................H01h 47/18
[58] Field of Search...................317/36 TD, 38, 141 S, 33 R; 307/293

[56] References Cited

UNITED STATES PATENTS

| 3,535,591 | 10/1970 | Holmquest | 317/36 TD |
| 3,560,798 | 2/1971 | Tenebaum | 317/36 TD |
| 3,590,326 | 6/1971 | Watson | 317/36 TD |

Primary Examiner—James D. Trammell
Attorney—A. T. Stratton and C. L. McHale

[57] ABSTRACT

An overcurrent protective circuit or means comprising static solid state non-linear elements connected in parallel with an input signal conditioning means such that an overload current in a protected circuit is sensed by the input signal conditioning means and then converted into a signal which is applied simultaneously to each of the non-linear elements. An output current which is directly proportional to or varies with the value of overcurrent in the protected circuit is generated by each non-linear element after the overload current exceeds predetermined values which may be different for the respective non-linear elements. The output from each of the non-linear elements, is supplied to a corresponding associated modulating means such as an oscillator, multivibrator or current generator. These modulating means combine to generate a current signal that is proportional to the overload current in the protected circuit raised to some power N where N is related to the number of modulating means. This current is then applied to charge a capacitor which effectively integrates the current with respect to time. Integration converts the charging current into a voltage signal which is directly proportional to the Nth power of the overload current in the protected circuit. The voltage signal is then compared with a reference or threshold voltage in a trigger circuit and when it exceeds the reference voltage, a signal is generated by the trigger circuit which actuates a circuit breaker tripping means causing the circuit breaker protecting the aforementioned circuit to open or trip.

16 Claims, 7 Drawing Figures

Patented April 4, 1972

WITNESSES
Bernard R. Gieguey
Martin J. Moran

INVENTOR
William H. South

BY
Clement L. McHale
ATTORNEY

CIRCUIT BREAKER INCLUDING IMPROVED OVERCURRENT PROTECTIVE CIRCUIT

BACKGROUND OF THE INVENTION

This invention relates generally to time delayed protective circuits for circuit breakers of the type which sense overcurrent in a protected circuit and then delay subsequent tripping of the circuit breaker protecting the circuit.

Generally, in the past, overcurrent protective circuits for circuit breakers were based upon the realization that the thermal damage to an electrical circuit and, more specifically, to the electrical equipment connected thereto, is related to the electrical power in the circuit and, correspondingly, the power in the circuit is related to the second power or square of the current in the circuit. Most of the early development was directed to either electromechanical or electrical circuits or devices which would sense any overload current in a protected circuit and generate a signal which was proportional to or would vary with the square of the overload current. This type of protection became known in the art as the $I^2t = K$ protection. It was realized that a protected circuit would withstand reasonable overload currents for certain periods of time without seriously damaging the circuit or ruining the equipment served by it. As mentioned, the function which best defined the criteria for overloading a circuit without seriously damaging it was the $I^2t = K$ relationship. Using this criteria, the time that a circuit remained in an overload condition prior to tripping was made inversely proportional to the square of the current in the circuit. Therefore, if a very small overload current flowed through a protected circuit, a circuit breaker would be actuated to eventually open the circuit if that amount of current continued to flow for a predetermined time period. Of course, as the amount of overload current became increasingly larger, the time before the opening of the circuit became increasingly smaller.

In recent years, another type of time delay protective circuit has been developed in which static circuitry is used to provide or generate the required time delay. This may be done by charging a capacitor with direct current which is related to the overload current and comparing the resultant voltage developed across the capacitor against a reference voltage. In such a circuit, the charging current may be related only to the first power of overload current, but an important disadvantage then results, because, as mentioned, it is the second power of current that is directly proportional or related to potentially destructive electrical power in a circuit.

In 1963, C. G. Dewey, in U.S. Pat. No. 3,105,920 disclosed an arrangement whereby non-linear elements, such as Zener diodes, are used to approximate the $I^2t = K$ function. In that arrangement, the non-linear elements created the desired function only approximately. In U.S. Pat. No. 3,317,794, W. C. Kotheimer disclosed an arrangement, whereby averaging of modulated pulses was used to create the $I^2t = K$ function. In this arrangement, the pulse width of a generated signal is kept constant and its amplitude and frequency are simultaneously modulated in accordance with the amount of overload current to create a second degree or second power charging current which is applied to an energy storing capacitor. Another protective means was disclosed in U.S. Pat. No. 3,317,795, which issued May 2, 1967 to F. L. Steen which included both a long and a short time delay circuit. In this patent, the long time delay circuit disclosed is similar to that disclosed by Kotheimer but instead modulates the frequency and pulse width of generated pulses while maintaining a constant amplitude of said pulses. The short time delay circuit of the Steen patent senses levels of overload current and by means of a gating circuit applies a high level voltage signal to an associated triggering circuit, bypassing an energy storing capacitor of the long delay circuit thus actuating the trigger circuit to produce an output signal. The short delay circuit in the Steen patent is used for protecting circuits where relatively high levels of overload currents may occur.

J. C. Gambole et al. in U.S. Pat. No. 3,343,084, issued Sept. 19, 1967 discloses a circuit which uses a Hall Generator and a saturable transformer to generate an $I^2t = K$ characteristic curve.

Known protective means of the type described lack a number of desirable advantages associated with the flexibility of such means, such as the ability of the protective means to respond to various levels of overload currents in different operating modes. For example, it would be convenient to employ a third power or greater time-versus-current operating response curve for overload currents just above the normal rated current thus delaying the time prior to circuit breaker tripping beyond that provided by the typical second power operating curve or characteristic. In addition, the ability of the protective means to provide a time-versus-current response curve for certain values of overload current, which relates current to time by an intermediate exponent or power, such as 1.5 might be desirable. This characteristic would be useful, for example, where a compromise between relatively slow (first power) and fast (second power) time-current response is desired. Such a flexible protective means might also permit more precise control of the time delay provided for overcurrents just above the normal rated current which has been difficult to obtain with any known protective means of the type described. Also it would be advantageous to generate curves of the type previously discussed without resorting to the use of transformers or the like which are heavy and which require relatively large amounts of power to function properly.

SUMMARY OF THE INVENTION

In accordance with the present invention, an input signal conditioning means is employed to sense overload currents in a protected circuit. The current signal of the latter means is converted to an output voltage signal which is applied to a plurality of non-linear elements arranged in parallel circuit relationship. The non-linear elements may comprise Zener diodes connected in circuit relationship with resistors and transistors. The Zener diodes, depending upon the connections in the non-linear element, may cause either the output voltage signal from the signal conditioning means to be converted, by the non-linear element, to a current output signal which is directly proportional to the voltage signal or produce a substantially constant current output signal even though the voltage signal is varying. These non-linear elements, in turn, are connected as signal sources to different types of modulating means. In the preferred embodiment of the invention, the first non-linear element is connected to an oscillator, the second non-linear element to a multivibrator, and the third non-linear element to an amplitude modulating device. All three of the above modulating means are connected in series circuit relationship.

When the first non-linear element is in a conducting condition, a modulating signal is provided to the oscillator which, in turn, creates a current signal in the form of pulses with a frequency substantially directly proportional to the modulating current signal from the first non-linear element. The signal from the oscillator is then applied to the multivibrator which produces a change in pulse width substantially proportional to the strength of its modulating signal which is derived from the second non-linear element. The pulses generated by the oscillator are therefore widened or modulated in substantially direct proportion to the second modulating signal. The twice modulated signal is then applied to the current generator, whereby in a similar manner, the amplitude of the pulses comprising the modulated signal is increased or modulated. It is therefore seen that three characteristics (frequency, width and amplitude) of the pulses in the resultant signal have been each linearly operated upon by a combination of modulating means and non-linear elements creating a resultant current which is substantially proportional in pulse area to the third power of the overload current in the protected circuit. The resultant current is then applied to charge a capacitor and is integrated by the capacitor creating a voltage ramp across the terminals of the capacitor. The slope of the ramp is directly proportional to the area of the pulses in the charging current. As long as a pulse in the train of pulses is present, the voltage ramp will increase. As soon as the pulse disappears, the ramp increase will stop temporarily or be interrupted. The voltage ramp is then impressed upon one set of terminals of a differentiating or comparing triggering circuit and a predetermined reference voltage is impressed on another set of terminals of the trigger or level detecting circuit. When the voltage from the charging capacitor exceeds the reference voltage, an output signal is produced by the triggering circuit to actuate a tripping operation in a circuit breaker protecting the circuit. As described, the time delay provided prior to a tripping operation is inversely proportional to the charging current. Thus a protective means for a circuit breaker is disclosed which provides a time delay which may be inversely proportional to the third power of the magnitude of overload current in the protected circuit.

Some of the particular advantages of this circuit are fine control near zero overload current, that is in the range of 0 percent overload to 100 percent overload. This is accomplished by using a third power time-versus-current response curve. It means that currents in the range just described can be detected and a very long delay in tripping, proportional to the third power of the current, can be generated which will allow a slight degree of overload to continue for a much longer time than would normally be the case with the typical second power time delay circuit. This provides adequate protection for a circuit and its attendant devices without interrupting the circuit prematurely. In addition, for overload currents in the range between 100 to 1000 percent overload as an example, the non-linear elements can be provided with any number of Zener diodes to cause any of the non-linear elements to alternate between conducting and non-conducting states as overload current increases. This gives the effect of changing from one time delay curve to another and back again for as many Zener diodes as can be built into the circuit. This creates an output charging current which is proportional to some intermediate power of overload current. Therefore finer control can be maintained in the normal operating region of the function generator. Also, a very high amount of overload current will be sensed immediately by the disclosed invention which will almost instantaneously cause a tripping of the circuit breaker even though the possibility of fine control near rated current and fine control in the normal operating range is not sacrificed.

BRIEF DESCRIPTION OF THE DRAWINGS

For a better understanding of the invention, reference may be had to the exemplary embodiment shown in the accompanying drawings in which.

DESCRIPTION OF THE PREFERRED EMBODIMENTS

Figure 1A:
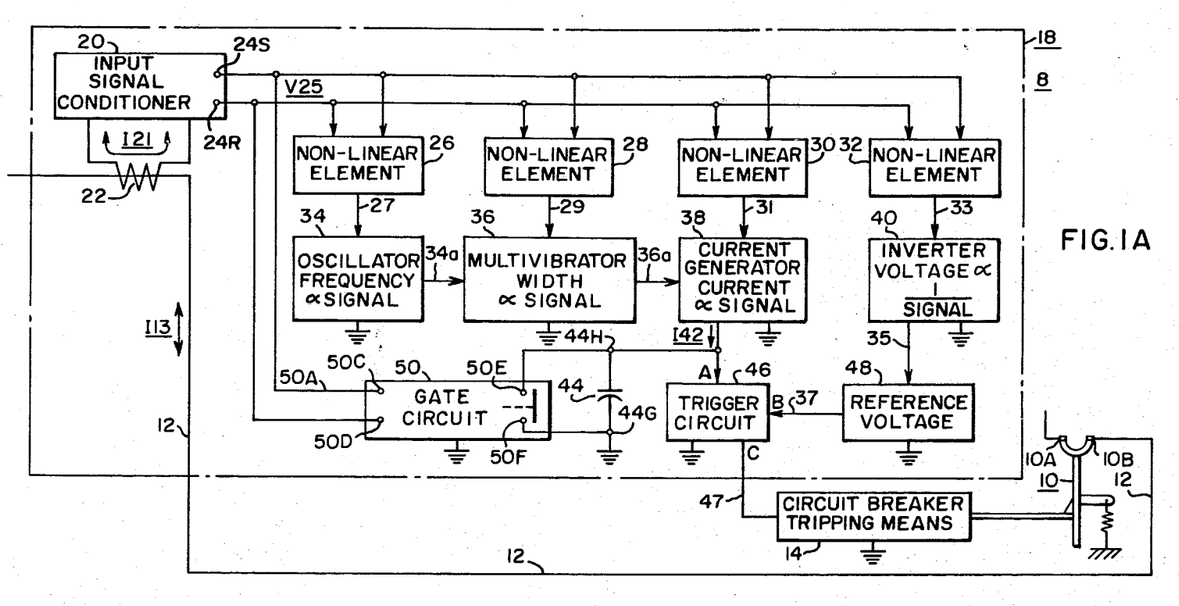
FIG. 1A is a block diagram of the elements of the function generator, the protected circuit, and the circuit breaker tripping means.

Referring now to FIG. 1A, circuit breaker control system 8 comprises a function generator 18, protected electrical circuit 12, a circuit breaker tripping means or mechanism 14, and a circuit breaker or interrupted 10 with separable main contacts 10A and 10B.

Function generator 18 comprises an input signal conditioning means 20 which may also be a source of circuit power and which includes current sensing means or current transformer 22 and output terminals 24R and 24S. These output terminals are connected to a series of non-linear elements 26, 28, 30 and 32. In turn, each of the non-linear elements 26, 28, 30 and 32 is connected in series circuit relationship with a modulating means. More specifically, non-linear element 26 is connected to first modulating means 34, non-linear element 28 is connected to second modulating means 36, non-linear element 30 is connected to third modulating means 38 and non-linear element 32 is connected to final modulating means 40. Each modulating means, in turn, performs a separate modulating function.

Modulating means 34 modulates by way of frequency control and comprises a pulse generating oscillator, the frequency of which is directly proportional to the output current signal it receives from the non-linear element 26 through the line or conductor 27. Modulating means 36 is monostable multivibrator which modulates pulse width in direct proportion to the output current signal it receives from non-linear element 28 through the line or conductor 29. Modulating means 38 is an amplitude modulating means which modulates current amplitude in direct proportion to the output current signal it receives from non-linear element 30 through the conductor 31. Modulating means 40 is a voltage signal inverting modulator which modulates in inverse proportion to the current signal it receives from non-linear element 32 through the line or conductor 33. Modulating means 34, 36 and 38, (the oscillator, multivibrator and current generator, respectively) are, in addition, connected in series circuit relationship with each other so that the oscillator 34 provides a modulated output signal which acts as an input signal at line 34a to multivibrator 36 which, in turn, provides an input signal at conductor 36a to the amplitude modulating current driver 38. Modulating means 40 is not connected in this series circuit but rather its output voltage is connected by line 35 to a reference voltage circuit 48.

In the preferred embodiment of the invention, each of the non-linear elements 26, 28, 30 and 32 is of such a type that at lower values of the output voltage signal V25 of the input signal conditioning means 20 which appears between the terminals 24S and 24R, the above-mentioned non-linear elements conduct or are turned on to pass electrical current. They do not necessarily conduct at higher values of voltage V25. Voltage V25 is substantially directly proportional to the current I21 which is produced in the current sensing means 22. Current sensing means 22 detects or senses current I13 flowing in protected circuit 12 and transfers this information to input signal conditioning means 20 which, in turn, determines if there is an overload current flowing in protected circuit 12. Stated differently, signal conditioning means 20 determines if the current I13 flowing in protected circuit 12 is above the rated value of current for that particular circuit or not. When the current in the protected circuit 12 is at or lower than rated current, input signal conditioning means 20 produces a voltage V25 between terminals 24R and 24S which, when applied to the input terminals 50C and 50D of gate circuit 50 on lines 50a and 50b, causes the output terminals 50E and 50F of gate circuit 50 to shunt or short-out capacitor 44 shown in FIG. 1A to prevent any tripping operation of circuit breaker 10.

When the current I13 in the protected circuit 12 increases to a value generally above its rated value, current generator 38 produces an output charging current signal I42 which is capable of charging capacitor 44. In addition, the shunting of capacitor 44 is removed by the action of gate circuit 50. The flow of current to the capacitor 44 produces a voltage across said capacitor which is directly proportional to the integral of the current I42. Assuming that the current I42 is at a constant or predetermined level or is comprised of pulses of constant amplitude, then the current I42 will produce a voltage across the capacitor 44 whose rate of rise or ramp rate is directly proportional to the area of the pulses of the current. Assuming more specifically that current I42 is in fact a pulse train of relatively closely spaced pulses such that there is relatively little time between pulses, the current I42 flowing to the capacitor 44 will produce a voltage or potential between terminals 44G and 44H which is substantially ramp shaped. This voltage is impressed upon trigger circuit or triggering means 46 between terminal A and ground and compared with a reference triggering potential or voltage and which is received from reference voltage generator 48 at the line or conductor 37. Reference voltage generator means 48 produces a voltage that varies inversely with the output voltage signal of modulating means 40. Trigger circuit 46 is a comparator type circuit, such as a Schmidt trigger circuit, in which the voltage at the first input terminal A is compared to the voltage at the second input terminal B. In this case, the voltage across the capacitor 44 is compared with the voltage produced by the reference voltage means 48. When the voltage across the capacitor 44 generally exceeds the value of the reference voltage from voltage means 48, the trigger circuit 46 will produce an output triggering signal at terminal C to line 47 which will actuate the circuit breaker tripping means 14 and cause circuit breaker 10 to open thus interrupting or opening protected circuit 12. Where desired, while the voltage across capacitor 44 is increasing in a ramp-like fashion, reference voltage generator 48 may produce a variable voltage at line 36 decreasing in a similar manner causing a quicker triggering of trigger circuit 46 and subsequent tripping of circuit breaker 10.

In operation, the function generator 18 and circuit breaker tripping system 14 cooperate in a predetermined manner. Assuming that the protected circuit 12 is carrying rated or normal current, the gate circuit 50 will be actuated by the signal conditioner output voltage V25. The voltage at terminal 24R is a relatively constant reference voltage and the voltage at terminal 24S varies generally in substantial proportion to the amount of overload current I13 in the protected circuit 12. Under these conditions, gate circuit or gating means 50 will assume an operating state which may short-out capacitor 44 thus preventing any actuation of the circuit breaker tripping means 14. Assuming that there is a small predetermined amount of overload current, which may be in the range of 110 to 120 percent of the normal rated value, gate circuit 50 will assume a state which will cause it to cease to short-out or shunt capacitor 44, but since that relatively low amount of overload current is not immediately critical the following operating conditions will result: Non-linear elements 26, 28, 30 and 32 are predetermined so as to remain in the linear operating mode for low values of output voltage 25. With an increase in voltage V25, the general sequence of operations is that the non-linear element 32 changes to a non-linearly current-conducting state before non-linear element 30 which, in turn, changes to a non-linearly current-conducting state before non-linear element 28, which in turn, changes to a non-linearly current conducting state before the non-linear element 26. For low values of overload current though, all the non-linear elements 26, 28, 30 and 32 are in substantially linear conducting states. Therefore, the output currents from any of the non-linear elements 26, 28, 30 and 32 which are connected to lines 27, 29, 31 or 33, respectively, are proportional to the slight variations of voltage 25. Because of this, the modulating means connected to each non-linear element will be modulated during the assumed operating conditions. This means that the oscillator or frequency generator 34 will put out a series of pulses the frequency of which varies with voltage V25 and the pulse width and pulse amplitude of which each can remain substantially constant. This pulse train is fed or coupled to the multivibrator unit or modulating means 36 which, in turn, alters the pulse width to be substantially proportional to the voltage signal V25 and passes or transfers the altered pulse train along to the modulating means 38. Similarly, the current amplitude modulating means 38 reacts such that the magnitude of the output current I42, is proportional to voltage signal V25 with a frequency the same as that of oscillator 34 and a pulse width the same as that of multivibrator 36. This current I42 is then applied to capacitor 44 which, as has been mentioned, is no longer shorted-out by gate 50 so that the capacitor 44 is charged by the pulse train or current signal 42. The application of the pulse train to the capacitor 44 produces a slowly rising voltage ramp thereacross which will tend to create a nearly infinite time delay for very slight overloads prior to any tripping operation of the circuit breaker 10.

Assuming that the current I13 in the protected circuit 12 increases from the 110–120 percent overload range just described to the range which is 120–150 percent of the normal rated current, the operation of the control circuit or function generator 18 changes. It is important to note that in these circumstances, the overload current I13 may eventually cause damage to the protected circuit 12 because of thermal considerations in the protected circuit 12. Therefore, a tripping operation of the circuit breaker 10 must be actuated in to interrupt the protected circuit 12 even if this operation is delayed for a relatively long time after the initial sensing of a predetermined overload current. Any increase in overload current I13 in protected circuit 12 is sensed by current sensing element or transformer 22 which provides an output current I21 which, in turn, through the action of the signal conditioner 20 generates an increased voltage differential between terminals 24R and 24S. This voltage differential V25 is of a value greater than that which would cause gate circuit 50 to short circuit capacitor 44 so that capacitor 44 is permitted to charge. Normally, non-linear element 26 has been preset to transfer or change to its non-linear mode of operation when the voltage V25 increases to a predetermined value due to a predetermined increase in overload current. This means that current at line 27 will then be constant rather than being directly proportional to voltage V25. The current at line or conductor 27, of course, modulates oscillator 34 and creates a pulse train similar to the one mentioned previously, but of constant frequency. Non-linear elements 28, 30 and 32 still modulate modulating means 36, 38 and 40 respectively. Therefore the trigger circuit 46 is operated in response to the third power of voltage V25.

Figure 4:
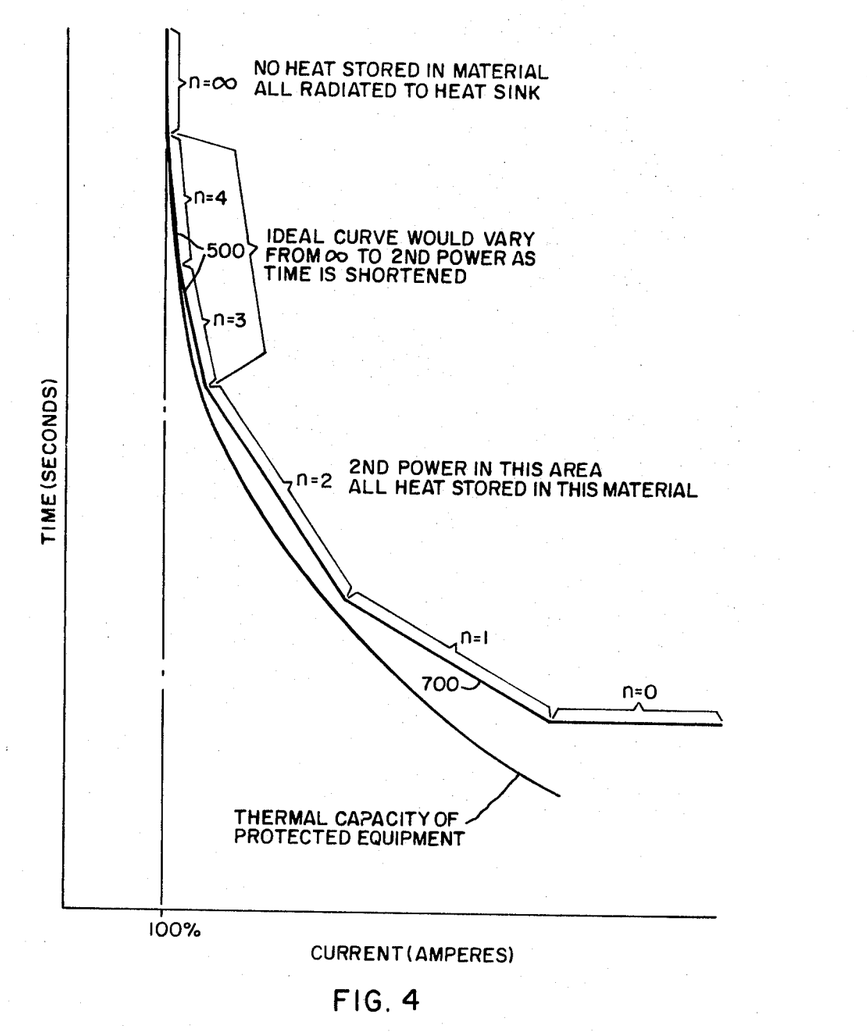
FIG. 4 is a plot of a typical time versus current characteristic of the invention on a log-log scale.

The triggering signal, produced at output terminal C of trigger circuit 46 will actuate circuit breaker tripping means 14 and cause circuit breaker 10 to open. However, as can be seen by examining FIG. 4, curve 500, the time necessary to charge capacitor 44 is proportional to the third power of the overload in the protected circuit 12 and the time delay for tripping is relatively long compared with subsequent time delays which will be described hereinafter.

As the amount of the overload current in protected circuit 12 becomes even larger, each of the other non-linear elements 28, 30 and 32 will change modes just as non-linear element 26 changed its mode from the linear state to the non-linear conducting state. In the next stage of operation, as the overload current in the circuit 12 increases further, voltage V25 will reach a value large enough to cause non-linear element 28 to switch from a linear mode to a non-linear mode such that current at line 29 will become constant as voltage V25 increases. Because of this operating condition, the previously indicated pulses which form part of the pulse train generated by the oscillator or pulse generator 34 when fed to the modulating means, multivibrator or pulse widener 36, will not increase in width once non-linear element 28 has switched from the linear to non-linear mode of operation. It will be understood that the resultant output signal at line 36a is then not directly proportional to the value of the overload current I13 in protected circuit 12 because two parameters of the pulses from the oscillator have not been operated on in direct proportion to the amount of overload current 13 in protected circuit 12 as was the previous case. That is, the frequency of the pulses has not been increased linearly in accordance with the value of the current I13 in the protected circuit 12 and the width of the pulses has not been increased in accordance with the value of the overcurrent I13 in the protected circuit 12. Assuming however, that the non-linear elements 30 and 32 remain in a linear state, the current generator 38 acts to modulate the pulse train amplitude and make the area of each pulse proportional to the second power of the overload current I13 and then pass it to capacitor 44. Since the average value of the current being produced is greater, the charging of capacitor 44 produces a steeper voltage ramp between terminals 44H and 44G. Consequently, the time it takes for the voltage at point A to reach or exceed the voltage at point B is less than in the previous case. It will be readily seen that if the current in protected circuit 12 is increased further, such that non-linear element 30 is transferred from its linear to its non-linear state, current at line 31 will become constant. As a result of this, the pulse train which emerges from modulating means 38 will produce an output current I42 which is no longer proportional to the current I13 in the protected circuit 12. But, the large non-varying pulses being supplied to capacitor 44 will cause a very steep ramp or rate of change in the voltage at point A of the trigger circuit 46. This voltage will reach or exceed the varying voltage at point B even sooner than in the previous cases and of course will cause a subsequent tripping of circuit breaker 10 in much less time as indicated by the steeper curve 700 in FIG. 4 which shows that the higher the magnitude of overcurrent I13, the shorter the time delay prior to tripping.

Finally, when the current I13 in the protected circuit 12 reached a very large value, which may for example, be 500 to 1,000 percent of rated current, non-linear element 32 will change from a linear state to a non-linear state, such that the current at line 33 will not be directly proportional to voltage V25 and, therefore, the voltage inverter modulating means 40 will produce a constant voltage at line 35. This voltage is applied to reference voltage means 48 which, in turn, generates a voltage at terminal B which cooperates with trigger circuit 46 and is inversely proportional to the amount of voltage at line 35. Thus the voltage at point A which is not proportional to the overcurrent I13 in the protected circuit 12 nevertheless increases in a ramp-like fashion toward the now lower but constant voltage at point B to produce an even quicker tripping signal to be generated at terminal C.

A review of the operation of the function generator 18 just described will show that for all ranges of overload current precise or fine control can be provided with respect to the time delay prior to tripping of the associated circuit breaker. Thus, not only is the function generator 18 capable of generating an inverse time delay, but the power of the time delay function it generates is also a function of the magnitude of overload current so that a relatively small overload current might produce a time delay prior to circuit breaker tripping inversely proportional to the fourth power of the overload current I13 while a relatively large overload current might produce a time delay that is inversely proportional to the first power of the magnitude of overload current.

Figure 1B:
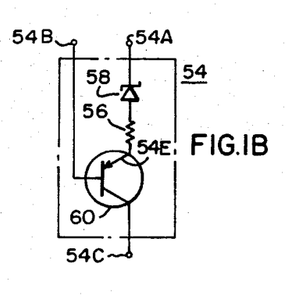
FIGS. 1B, 1C and 1D show possible arrangements of Zener diodes, resistors and transistors to create passing or clamping of the signal from the associated input signal conditioning means shown in FIG. 1A.

Referring now to FIG. 1B, a typical example of a static or solid state non-linear element 54 as used in function generator 18 is shown. Non-linear element 54 comprises a Zener diode 58, a resistor 56 and a transistor 60 connected in series circuit relationship. The non-linear element 54 has three external terminals 54A, 54B and 54C. Voltage V25 is impressed between terminals 54A and 54B with terminal 24S of the input signal conditioner 20 as shown in FIG. 1A being connected to terminal 54A and terminal 24R being connected to 54B. Terminal 54C supplies the output current. When a low value of voltage V25 is impressed between terminals 54A and 54B, current will not flow from terminal 54C, which is attached to the collector of transistor 60, because of the property of Zener diode 58 of not allowing any current to flow through it for applied voltages below its breakdown voltage. However, as soon as a predetermined minimum value of voltage 25 is reached, as determined by the breakdown voltage characteristic of Zener diode 58, the Zener diode 58 will conduct current with a substantially constant voltage drop. This voltage drop is generally negligible when compared to the voltage drop across resistor 56. This circuit allows current to flow out of collector 54C which is substantially proportional to the increase in voltage between terminals 54A and 54B, because once transistor 60 has been biased into conduction by the application of voltage between terminal 54B and emitter 54E, current will flow from emitter 54E to collector terminal 54C which is substantially proportional to the voltage impressed between terminals 54A and 54B and also substantially proportional to the value of the resistor 56.

Figure 1C:
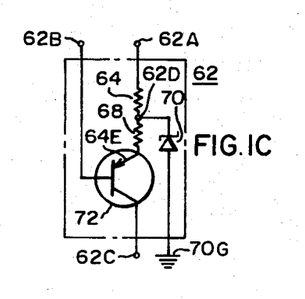

Referring to FIG. 1C, there is shown a non-linear element with an opposite operating effect from the one just described. In this case, non-linear element 62 will conduct electrical current in substantial proportion to low values of signal conditioner voltage V25 but will not conduct at higher values. In this embodiment, Zener diode 70 is connected to the junction 62D of two resistors 64 and 68, with the resistor 68 being also connected to the emitter 64E of transistor 72. The non-linear element 62 has four terminals including a ground terminal 70G for Zener diode 70. As with the non-linear element 54 shown in FIG. 1B, voltage V25 is applied between terminals 62A and 62B and the output current is available at terminal 62C. In this case, once a relatively small predetermined value of voltage V25 is impressed between terminals 62A and 62B, such that transistor 72 is biased to conduction, current will flow from terminal 62C which is substantially proportional to the value of the voltage impressed between terminal 62A and 62B. While this is happening, the voltage impressed on resistors 68 and 64, which form a voltage divider, increases until the value of the voltage at junction 62D is higher than the breakdown voltage value of Zener diode 70. Zener diode 70 then conducts current to ground terminal 70G with a substantially constant voltage drop thereacross. This has the effect of maintaining the voltage at terminal 62D at a constant or predetermined value so that regardless of a higher voltage V25 being applied between terminals 62A and 62B, the voltage between terminals 62D and 62B will remain substantially unchanged. Thus, the current flowing from terminal 62C will be substantially constant or remain at substantially a predetermined value. Any additional current will be shunted to ground through Zener diode 70.

Figure 1D:
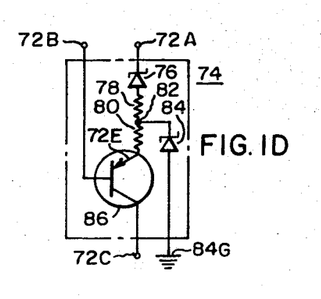

Referring to FIG. 1D, there is shown a non-linear element 74 which combines the concepts employed in the non-linear elements of FIG. 1B and FIG. 1C. Non-linear element 74 will alternate between operating stages of linearity and non-linearity as the voltage V25 is increased across terminals 72A and 72B, with the current flowing out of terminal 72C at times being proportional to the voltage between terminals 72A and 72B and at other times not being proportional. This non-linear element may be employed to provide the half power operating effect that was discussed previously. For example, the turning on and off of this non-linear element in function generator 18 could be programmed or predetermined to generate a function which oscillates between a second power and a third power overload current versus time curve. This would synthesize or result in a curve that appears to be 2½ power curve. In this case, the non-linear element 74 as shown in FIG. 1D comprises two Zener diodes 76 and 84 interconnected in circuit relationship with resistors 78 and 80 and transistor 86. As the voltage V25 impressed between terminals 72A and 72B increases, substantially no current flows out of terminal 72C until the breakdown voltage of Zener diode 76 is reached. In the latter case, Zener diode 76 conducts with a substantially constant voltage thereacross and current flows from terminal 72C which is substantially proportional to the voltage V25 impressed across terminals 72A and 72B until the voltage at junction 82 exceeds the breakdown value of Zener diode 84 which will then electrically conduct and shunt current away from terminal 72C to ground terminal 84G. This, therefore, is an element which operates initially in a non-linear fashion and then as voltage V25 is increased and reaches a certain predetermined value, output current flows from terminal 72C which is substantially proportional to the voltage V25 until voltage V25 reaches a higher predetermined value when the current from terminal 72C once again becomes substantially constant and is therefore no longer proportional to the increasing value of voltage 25.

Each of the elements shown in FIGS. 1B, 1C and 1D may be used interchangeably for non-linear elements 26, 28, 30 and 32 shown in FIG. 1A.

Figure 2:
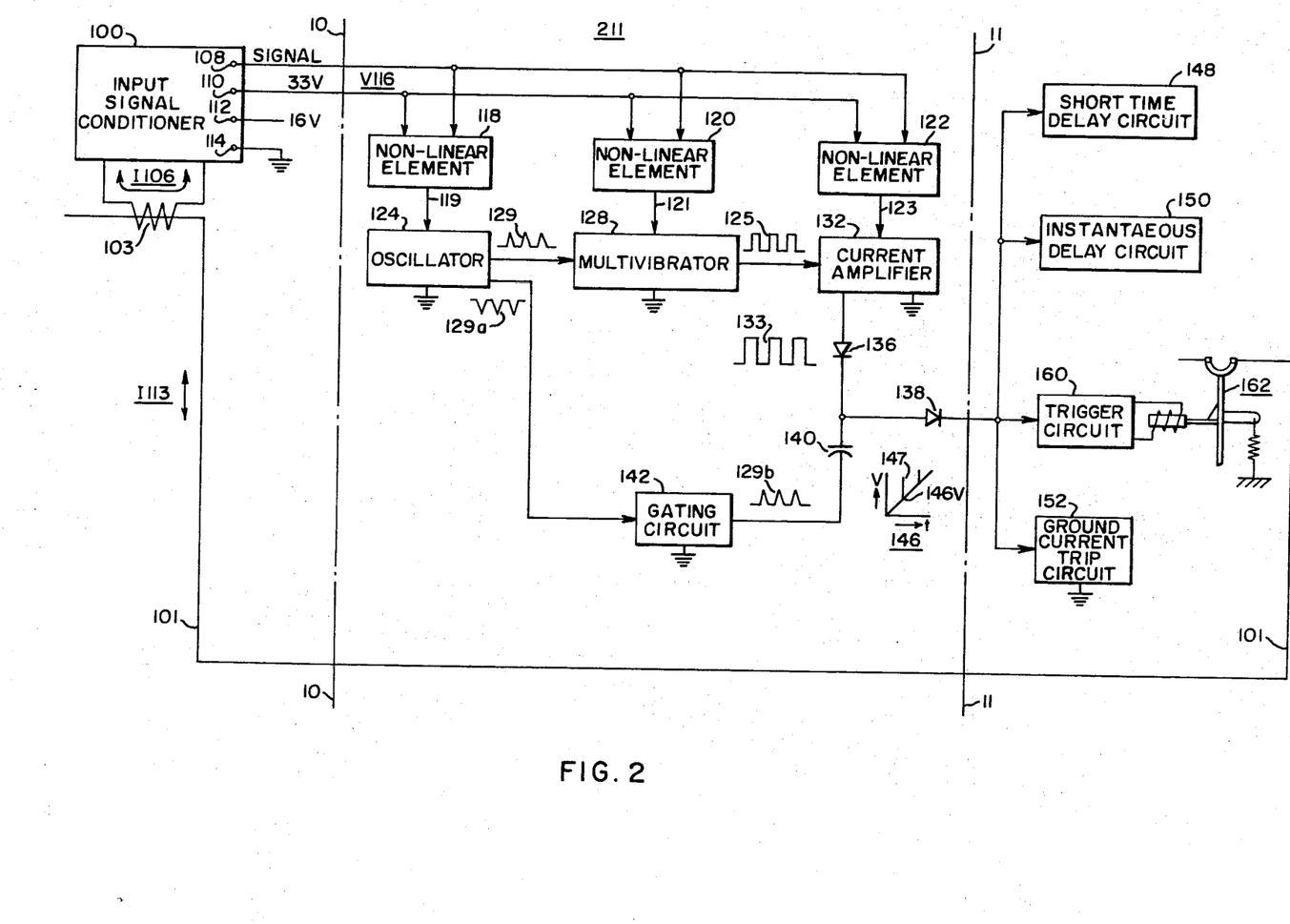
FIG. 2 is a block diagram of a second embodiment of the invention in which three non-linear elements, three modulating means and associated auxiliary means are used in conjunction with an existing circuit breaker control system.

Another embodiment of the invention is shown in FIG. 2. This embodiment is similar to the one shown in FIG. 1 except that the part of the circuit shown between dotted lines 10 and 11 may be substituted for the "LONG TIME DELAY TRIPPING CIRCUIT 200" shown in FIG. 1 of copending application Ser. No. 765,584, filed Oct. 7, 1968 by J. D. Watson et al and assigned to the same assignee as this invention. A reference to FIG. 1 of the aforementioned copending application shows that input signal conditioner 100 in the present application corresponds generally to and may be of the type described in detail as the "POWER SUPPLY INPUT CIRCUIT" 100 in said copending application. To the right of line 11 of FIG. 2 in the present application it will be noted that the short time delay circuit 148 corresponds to the "SHORT DELAY TRIPPING CIRCUIT" 500 of FIG. 1 of the above copending application and similarly, the instantaneous delay circuit 150 corresponds to the "INSTANTANEOUS TRIPPING CIRCUIT" 300, the ground current trip circuit 152 corresponds to the "GROUND CURRENT TRIPPING CIRCUIT" 600 and trigger circuit 160 corresponds to "OUTPUT CIRCUIT" 400. In addition, circuit breaker 162 corresponds to circuit breaker "CB." Generally speaking, the "LONG TIME DELAY TRIPPING CIRCUIT" 200 of FIG. 1 of the last-mentioned copending application differs from the circuit means shown in block form between dotted lines 10 and 11 of FIG. 2 of this application in that the long time delay tripping circuit of the previous application discloses a means for modulating only two parameters of a pulsed signal in accordance with the overload current in the protected circuit thus creating a squaring function, while in the present application, the block diagram of FIG. 2 shows a cubic or 3rd power time versus current function generator.

Referring specifically to FIG. 2 of this application, the circuit indicated by the functional block diagram to the left of line 10 operates in a similar manner to a corresponding portion of the function generator 18 shown in FIG. 1 of this application as was previously described. Protected circuit 101 is monitored by the input signal conditioning unit 100 by way of a current sensing device or transformer 103 which generates a current I106 substantially proportional to the amount of overload current I113 flowing in protected circuit 101. The input signal conditioning device 100 has four output terminals. Output terminal 108 is a signal output terminal and provides an output voltage the amplitude of which is substantially proportional to the input signal current I106. Second output terminal 110 is one terminal of a direct current 33 volt reference source. This 33 volt reference source cooperates with the signal voltage at the terminal 108 to provide a voltage difference V116 between terminals 108 and 110 which is then supplied to the non-linear elements such as 118, 120 and 122 in other parts of the system 211. In addition, a direct current 16 volt power bus terminal 112 is supplied and a ground circuit terminal 114 is supplied.

Voltage V116 is supplied to three non-linear parallel elements in function generator 211 which may be any of the types previously described and shown in FIGS. 1B, 1C or 1D. For example, in this embodiment of the invention, the type of non-linear element shown in FIG. 1C may be used in certain portions of the function generator. This element allows for linear operation for lower values of voltage V116 but operates non-linearly as voltage 116 becomes larger. As shown in FIG. 2, there are three non-linear elements 118, 120 and 122. Each of these provides a modulating current signal at the output lines or interconnections 119, 121 and 123, respectively, to the modulating devices or means 124, 128 and 132, respectively. Modulating device 124 is a variable frequency oscillator which produces an output signal proportional to the input current signal on conductor 119. The output signal 129 is a series of substantially constant width, substantially constant height, variable frequency pulses in a form of a pulse train. This pulse train 129 acts as an input to multivibrator or one-shot or monostable delay multivibrator 128. Pulse train 129 is modulated by multivibrator 128 in proportion to the current signal at conductor 121 to produce a second pulse train output signal 125 which has the same frequency and height as signal 129 but has a width proportion to the value of current on conductor 121. Finally, pulse train 125 acts as an input signal to the third modulating current amplifier means 132. Pulse train 125 is modulated by current amplifier 132 in proportion to the signal at conductor 123 to produce a third pulse train output current 133 whose amplitude is dependent upon the signal at line or conductor 123. Three parameters, pulse, frequency and amplitude, of the pulse train may thus be modulated, each in substantially direct proportion to the amount of overload current I113 in the protected circuit 101 to give an output current or pulse train 133, the area of which is substantially proportional to the third power of the magnitude of overload current 113 in the protected circuit 101. This pulse train is fed through an isolating diode 136 so that capacitor 140 will not discharge through the modulating means 132. Capacitor 140 is charged by current pulse train 133. The charging of capacitor 140 by current 133 creates a voltage ramp 146V which is substantially proportional to the area of the current signal 133. Disregarding the function of circuit 142 momentarily, it will be seen that capacitor 140 charges to a voltage value which eventually breaks down or forward biases diode 138 and provides an output signal to the trigger circuit 160 shown on the right side of line 11. The functions of the other boxes to the right of line 11 of FIG. 2 have previously been explained, and are explained in greater detail in copending application, Ser. No. 765,584, previously mentioned. The gating circuit 142 on the left side of line 11 of FIG. 2 has a particular function in that it receives the pulse train 129a from oscillator 124, inverts it to form pulse train 129b and superimposes it upon the voltage ramp 146V of capacitor 140 to form a composite voltage function 146 on the capacitor 140. The peaks 147 on curve 146 are used to cause an instantaneous triggering of circuit 160 as the value of the voltage on capacitor 140 comes close to or approaches the trip level of voltage for trigger circuit 160.

Figure 3:
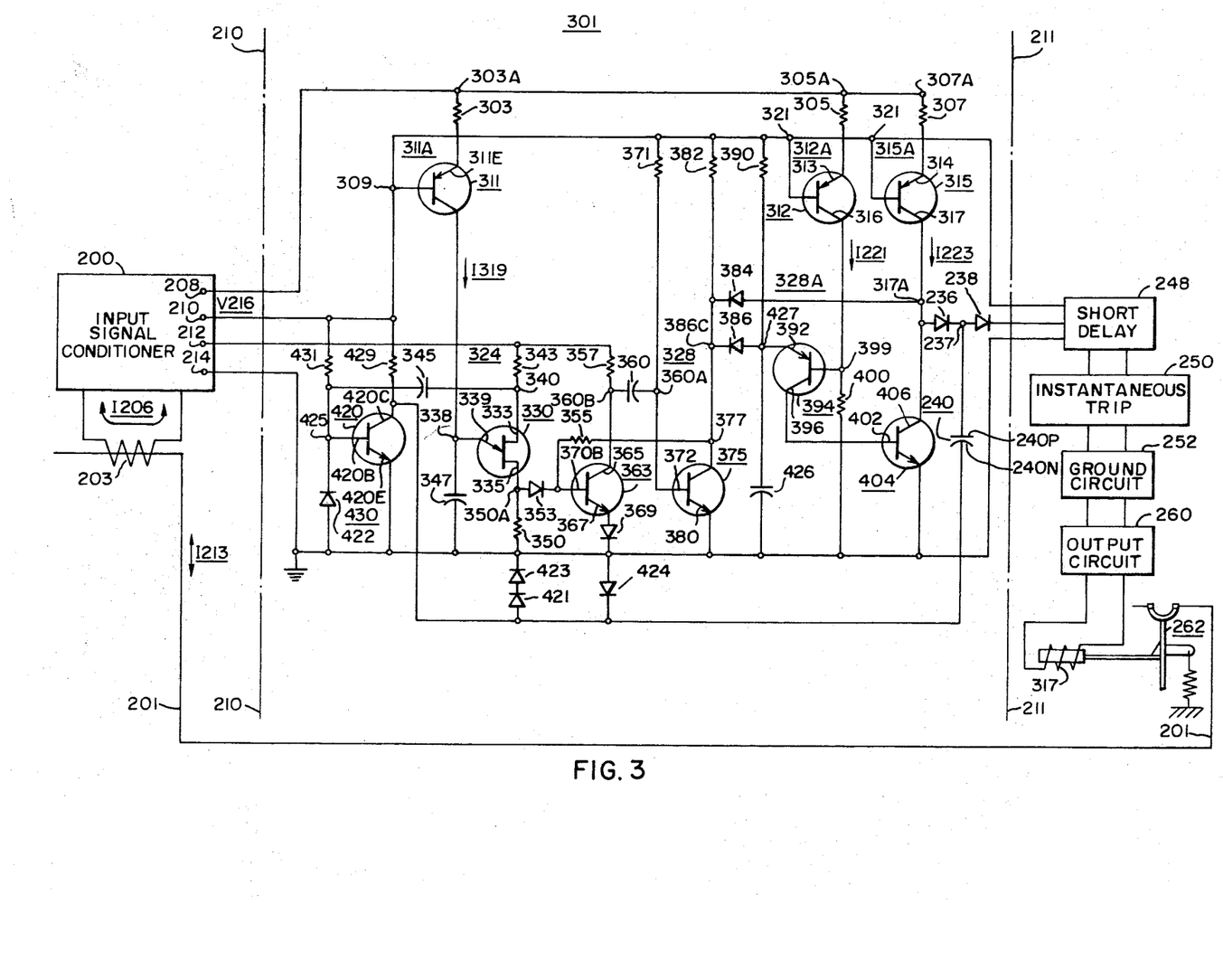
FIG. 3 is a schematic diagram of the second embodiment of FIG. 2.

Referring now to FIG. 3, a more detailed schematic representation of the circuit shown functionally in FIG. 2 is illustrated. It is to be noted that line 210 and line 211 in FIG. 3 correspond to lines 10 and 11 of FIG. 2, respectively, and that the input signal conditioner 200 to the left of line 210 in FIG. 3 corresponds to the input signal conditioner 100 to the left of line 10 in FIG. 2. Similarly, the circuits 248, 250, 252 and 260, as well as the circuit breaker 262, which are shown at the right of line 211 in FIG. 3 correspond to their respective counterparts 148, 150, 152, 160 and 162, which are shown to the right of line 11 of FIG. 2. Basically, with only a few exceptions, the functions of the circuits in FIGS. 2 and 3 are the same. The overall circuit or function generator shown between lines 210 and 211 of FIG. 3 and designated by the reference number 301 represents the function generator 211 shown between lines 10 and 11 of FIG. 2. The description of the operation of the function generator 301 will be considered in the light of the description of the functional operation previously described with respect to FIG. 2. Protected circuit 201 is protected by a circuit breaker 262. Circuit 201 is monitored by the input signal conditioning unit 200 in combination with input sensing means or current transformer 203 which provides a current 206 substantially proportional to the amount of overload current 213 in protected circuit 201. Input signal conditioner 200 has four output terminals. Terminal 208 is a signal output terminal; terminal 210 is a 33 volt output terminal; terminal 212 is a 16 volt output terminal; and terminal 214 is a ground terminal. A signal voltage 216 is established between reference voltage terminal 210 and signal voltage terminal 208. This voltage is impressed across the input circuit of three elements. The three elements shown in FIG. 3 and designated by numbers 311A, 312A and 315A differ from the non-linear elements 118, 120 and 122 shown in FIG. 2 in that these elements do not have any non-linear properties, that is, each is devoid of a Zener diode or similar non-linear device. Non-linear elements of the type shown in FIGS. 1B, 1C and 1D may be used and the types of functions or characteristics therein described could be provided but for the particular purpose of simplifying the operation of this circuit, a non-linear element is not provided. The fact that non-linear elements are shown and used with respect to FIG. 2 and not shown with respect to FIG. 3 is indicative of the flexibility of this type of circuit.

Overload current I213 in the protected circuit 201 is reflected through the monitoring device 203 thereby providing a signal current I206 which is converted or rectified by the signal conditioner 200 to a voltage 216. This voltage 216 is impressed simultaneously upon the three elements 311A, 312A and 315A by applying the reference voltage present at terminal 210 to transistors 311, 312 and 315 at base terminals 309, 311 and 321, respectively. Concurrently, the signal voltage present at terminal 208 is impressed simultaneously on one side of resistors 303, 305 and 307, respectively, at point or junctions 303A, 305A and 307A, respectively. Referring first to element 311A, the voltage V216 which is impressed between terminals 303A and 309 causes transistor 311 to conduct linearly as an amplifier with the current I319 flowing into the collector circuit of transistor 311 being substantially proportional to the voltage V216. Current I319 flows into junction 338 of oscillator 324. Upon reaching junction 338, current 319 flows into capacitor 347 rather than into unijunction transistor 330 because unijunction transistor 330 acts as a high impedance load to current 219 when unijunction transistor 330 is turned off. However, the current I319 charging capacitor 347 produces a periodic increase in voltage across capacitor 347. When this voltage exceeds the firing point of unijunction transistor 330, the transistor 330 turns on, providing a low impedance discharge path from the capacitor 347 through junction 338 and the emitter-base (1) path 339 to 335 of unijunction transistor 330. As unijunction transistor 330 turns on, the effective impedance of the circuit consisting of resistors 343, 350, and the base (1) 355-base (2) 333 path of unijunction transistor 330 decreases in magnitude therefore increasing the current in this path. This increase in current causes a current pulse to flow through the resistor 350 and is measured or reflected at junction 350A. This pulse has a constant amplitude because resistor 350 is fixed in magnitude. It is also fixed in width as the discharge time of the capacitor 347, which determines the pulse width, is substantially constant and independent of the charging time. But the frequency of the pulses is dependent upon the charging time of capacitor 347 which is dependent upon the amplitude of current I319 which is, in turn, dependent upon voltage V216. Therefore, it can be seen that the frequency of the current pulse train flowing through resistor 350 is proportional to the amount of overload current 213 in protected circuit 201. The unijunction transistor 330 and its associated resistor 343, resistor 350 and capacitor 347 illustrate one form of the oscillator 124 indicated in FIG. 2.

As illustrated, diode 353 operatively interconnects oscillator 324 shown in FIG. 3 and multivibrator 328 shown in FIG. 3. In addition to the pulse train described above, another series of pulses is concurrently generated at junction 340. The frequency of these pulses is the same as the frequency of the pulses at junction 350A. There is a difference however in that the pulses at the junction 340 are negative going in polarity while the pulses at junction or node 350A are positive going. The reason for this is that the effect of turning unijunction transistor 330 on is to reduce the resistance in the voltage divider formed by the base (2)-to-base (1) resistance, (333-to-335) of unijunction transistor 330, resistor 343 and resistor 350. The resistance of the upper portion of this voltage divider is periodically decreased, therefore allowing the voltage at point 350A to periodically increase, while the voltage at node or point 340 periodically decreases.

The pulses at junction 340 are coupled through coupling capacitor 345 to a circuit 430 which corresponds to the gating circuit 142 in FIG. 2 which is sometimes referred to as a jogging circuit. The circuit 430 is formed by a transistor 420 and its associated collector resistor 429, base resistor 431 and diode 422. Resistor 431 which is connected to output terminal 210 (the 33 volt power supply terminal) conducts unidirectional or direct current to junction or node 424 and into the base 420B of transistor 420. This has the effect of keeping transistor 420 turned "on" or saturated so that collector 420C of transistor 420 is at substantially ground potential in the absence of a being pulse transmitted to base 420B through capacitor 345. Diode 422 assists in keeping transistor 420 turned on and also assists in protecting transistor 420 in that it maintains node or junction 424 at a one diode voltage drop difference from ground potential. Diode 422 also insures that the base to emitter circuit of transistor 420 (420B-to-420E) is never subjected to any more than one diode voltage drop reverse bias. When a voltage pulse is present at the base of transmitter 420, transistor 420 becomes reverse biased and the current which was flowing through it is conducted to the ground through the diodes 422 and 423. This action puts a voltage potential on the lower terminal 240N of capacitor 240 which is at least two diode voltage drops above ground. The effect of this is to create voltage spikes or pulses at the upper terminal 240P (also junction point 237) of capacitor 240, which are used to insure more positive turn-on of the trigger or output circuit 260 when the rising voltage on capacitor 240 which is produced by the operation of the balance of the function generator 301 approaches the turn-on operating point or level of the output trigger circuit 260. This voltage on the capacitor 240 is illustrated by curve or waveform 146 shown in FIG. 2. The voltage spikes, designated 147 are superimposed on slowly rising voltage 146V. Capacitor 240 in FIG. 3 corresponds to capacitor 140 in FIG. 2 and diodes 238 and 236 in FIG. 3 correspond to diodes 138 and 136, respectively, in FIG. 2. Diode 424 is used to protect the collector-emitter circuit (420C-to-420E) of transistor 420 from large reverse bias voltage that results when capacitor 240 discharges by limiting the voltage across said circuit.

Referring again to the other output junction 350A of the oscillator 324 comprising unijunction or double-base transistor 330 it can be seen that the output pulse train feeds diode 353 which is the interconnecting link between the oscillator circuit and the one-shot multivibrator circuit 328 as indicated to the right of diode 353. Specifically, the one-shot multivibrator or pulse widening circuit 328 comprises two transistors 363 and 375. Initially, in the absence of any pulses being fed through diode 353, transistor 375 is in the "on" or conducting state and transistor 363 is in an "off" or substantially non-conducting state. One of the purposes of diode 353 is to prevent the turn-on of transistor 363 by the presence of a slight biasing voltage across resistor 350. Diode 353 and diode 369 as well as the intrinsic diode junction between the base 370B and the emitter 367 of transistor 363 help reverse bias the pulse widening or delay multivibrator circuit 328 to keep transistor 363 turned off. Diode 353 has the additional function of preventing any feedback into the oscillator circuit 324 toward node or junction point 350A as a result of the operation of the monostable multivibrator circuit. Since transistor 363 is normally "off" or substantially non-conducting, resistor 357 carries little or no current. On the other hand, current limiting collector resistor 382 of "on" transistor 375 carries substantial current which flows through transistor 375 to ground. Also during this period, resistor 371 is only conducting enough current to keep transistor 375 turned on. The current flowing through resistor 371 flows into the base 372 of transistor 375 and becomes part of the emitter current flowing out of emitter 380 of transistor 375. Resistor 371 is used in conjunction with capacitor 360 to create the timing circuit for the delay multivibrator or pulse widening circuit 328. During normal operation, in the presence of any modulation, the multivibrator or one-shot multivibrator 328 will generate an output pulse train at node 377 or at the collector of transistor 375 which contains pulses of substantially constant width at the frequency of the pulse train being fed to the multivibrator stage through diode 353.

When the first positive going pulse of the pulse train is fed through diode 353 to base 370B of transistor 363, it overcomes the reverse voltage of the intrinsic base-to-emitter or junction of transistor 363 and turns transistor 363 on. This causes the voltage at junction point 360B to change from nearly 16 volts to substantially ground potential. Since voltage cannot change instantaneously across a capacitor, node 360A follows the potential change at junction or node 360B. Since node 360B experiences an approximate −15 volt change, the voltage at node 360A is forced to change to approximately −15 volts from the zero volts at which the node 360A was previously. This, in turn, causes the potential on base 372 of transistor 375 to change from nearly zero to nearly −15 volts also. This causes transistor 375 which was "on" to become reverse-biased as it's base-to-emitter junction (372-to-380) and turn off. When this happens, the current which flows through resistor 382 and the normally "on" transistor 375, is diverted to resistor 355 and acts to keep transistor 363 turned "on" by supplying base drive current to it until the timing cycle as controlled or determined by resistor 371 and capacitor 360 has been completed. Almost immediately, the voltage at point or junction 360A begins to rise, becoming more positive as capacitor 360 charges toward zero voltage potential again because of current which flows through resistor 371, the collector-to-emitter circuit of transistor 363 (365-to-367) and the diode 369 to ground. When the voltage at point 360A becomes greater than the "turn-on" voltage of transistor 375, transistor 375 is turned on, thus once again providing an emitter-to-collector path (377-to-380) in transistor 375 for the current flowing through resistor 382. This causes the current which was flowing almost entirely through resistor 355 to decrease allowing some to flow through the previously mentioned alternate path of transistor 375. When this happens, the base drive current necessary to sustain saturation in transistor 363 is no longer present and transistor 363 turns off again until the next pulse arrives through diode 353.

Pulse width modulation is accomplished by the circuit 328A which comprises the transistors 312, 394 and 404; resistors 382, 390, 305 and 400; diodes 384 and 386 and capacitor 426. As long as transistor 375 is turned on, as it is normally in the absence of a pulse from diode 353, diodes 386 and 384 are forward biased to ground causing certain operating conditions of the circuit to prevail. First, diode 386 forms part of a conducting path to ground with current flowing from the reference voltage terminal 210 of the input signal conditioner 200 through resistor 390, diode 386 and to return or ground terminal 214 of the input signal conditioning means 200. This provides a low impedance current path shunting or in parallel with capacitor 426 and the combination which includes the transistors 404 and 394. In addition, the output circuit 260, as controlled by transistor 404, is also shorted to ground or to a common conductor as the case may be. This insures that there will be no output pulse and subsequent opening of the circuit breaker 262 while transistor 375 is "on" or saturated.

When, however, a pulse is present at the base 370B of the transistor 363, transistor 375 is turned off. Therefore the potential at point or terminal 386C is no longer close to the potential at the terminal 214 or ground and consequently diodes 386 and 394 perform different functions. Diode 386 becomes reverse biased and substantially non-conducting, allowing capacitor 426 to charge through resistor 390 from the positive reference voltage at terminal 210. In addition, since the voltage at point 386C is higher than the voltage at the collector 406 of transistor 404 (equivalent in potential to node 317A), diode 384 also becomes reverse biased. The effect of this is to cause the voltage at point 427 to rise as substantially constant current is being supplied to capacitor 426 by terminal or bus 210 through resistor 390. This applies an increasing voltage to the emitter 392 of transistor 394 whose base is connected to junction point 399. It will be noted that transistor 312 performs the same function as mentioned previously when describing the function of transistor or amplifier element 311. That is current 221 flowing in collector circuit 316 is substantially proportional to the voltage drop between junctions 311 and 305A. This causes current to flow through resistor 400 which, in turn, causes the voltage at point or junction 399 to rise at a rate which is substantially proportional to the voltage 216. Since the predetermined time required for the rise in the voltage at point 427 is determined by the values of capacitor 426 and resistor 390, the amount of current flowing through resistor 400 can be predetermined. Similarly, the value of the voltage at point 399 can be predetermined, thus making the time for turn-on of transistor 394 substantially proportional to the voltage drop across resistor 305.

As can be seen, when the voltage at point 427 exceeds the turn-on voltage of transistor 394, transistor 394 turns on. When this happens, the charge on the timing capacitor 426 along with any current flowing in resistor 390 rapidly discharges through the emitter 392 of transistor 394 and out of its collector 396. This current is of sufficient value to flow into the base 402 of transistor 404 and turn transistor 404 "on" or to saturate it. As will be recalled, as long as transistor 375 is turned on, the current 223 flowing out of collector 317 of transistor 315 is conducted through diode 384 and transistor 375 to ground or common allowing only a relatively low current to flow into diode 236 for the charging of capacitor 240. However, the instant that the transistor 375 is turned off or driven to cut-off, that path is no longer available for current flow. As a result, transistor 404 is turned off, and current cannot flow to ground through it. Therefore, the only available return path to the power supply is through diode 236 and into capacitor 240 thus charging it in a manner previously described. This continues until the previously mentioned sequence of event occurs and transistor 404 is turned on again. When transistor 404 is turned on, a very low impedance path is created between ground and the point or junction 317A such that current 223 will no longer flow into diode 236 and capacitor 240 but will flow to ground terminal 214 through transistor 404. The overall effect of this operation is to create a pulse that will flow into diode 236 and consequently into capacitor 240 at the instant that the leading edge of each pulse of the pulse train created by the oscillator 324 flows into diode 353. Electrical current flow continues until the modulated timing current created by the voltage drop across resistor 400 allows current to flow into the base 402 of transistor 404 thus causing saturation of transistor 404 and shunting current away from capacitor 240 and diode 236. The pulse width created is substantially proportional to voltage 216. That voltage, in turn, is directly proportional to the magnitude of overload current 213 in the protected circuit 201.

By way of recapitulation, the oscillator 324 generates a pulse train, the frequency of which is directly proportional to voltage 216 and the one-shot pulse widening circuit or delay multivibrator combination 328 and 328A widens each of the narrow pulses in the train in substantial proportion to the magnitude of overload current 213 flowing in circuit 201.

Generally this circuit will give an $I^2t = k$ functional output but amplitude modulation of the resultant pulse train may be accomplished to give a cubic or $I^3t = k$ functional output by using an amplifier circuit 315A comprising transistor 315, from which previously mentioned current 223 may flow, and resistor 307. The voltage 216 between junction points 321 and 307A is impressed across resistor 307 and thus creates a current 223 which is substantially proportional to that voltage. As mentioned previously, voltage 216 is substantially proportional to the magnitude of overload current 213 in protected circuit 210. Therefore, the amount of current flowing into capacitor 240 through diode 236 may be made substantially proportional to the magnitude of overcurrent 213 as well as to the frequency and pulse width of the previously mentioned pulse train. As described previously, when capacitor 240 charges, junction point 237 has a voltage impressed upon it which increases substantially linearly to form a voltage ramp. The lower side or negative side 240N of capacitor 240 is attached to the jogger circuit 430 at junction points 429J which applies voltage spikes to the lower side 240N of the capacitor 240. These voltage spikes pass instantaneously through the capacitor 240 since the voltage drop across the capacitor cannot change instantaneously, and are superimposed on the voltage ramp at the terminal 237. This operation creates a voltage curve which looks similar to curve 146 in FIG. 2. When voltage at junction 237 equals the voltage necessary to trigger output circuit 260 through diode 238, the output trigger 260 will, independently of elements 248, 250 and 252, cause or actuate solenoid 317 to respond in such a manner that circuit breaker or interrupter 262 will trip open or interrupt protected circuit 201 after a time delay which is inversely proportional to the third power of the overload current 213 flowing in protected circuit 201.

It is to be understood that the circuit shown in FIG. 3 acts independently of the elements 248, 250 and 252 shown in FIG. 3 and that, where described, the non-linear type of elements shown in FIGS. 1B, 1C and 1D may be substituted for the linear elements 311A, 312A and 315A shown in FIG. 3. It is also to be understood that although a single phase alternating current protected circuit is shown for purposes of illustration, multi-phase or polyphase circuitry can be protected in the same manner, merely by adding another sensing means to the input signal conditioner 200 and additional contacts to the circuit breaker. It is also to be understood that the circuit will function without the use of the jogger or jogging circuit 142 as described in FIG. 2. This circuit is added to cause a more positive tripping action as the value of trigger voltage approaches the triggering point of the trigger or output circuit. It is also to be understood that the sequence of operation of the modulating elements described may be changed where desired. In the primary embodiment of the invention all non-linear elements are made to conduct linearly at low values of overload current 1213 and to change to the new linear state preferably in the following order: 32, 30, 28, 26 for the elements shown in FIG. 1, as overload current increases. Also the percent of overload current which causes the initial operation in the protective circuit can be varied. It should also be understood that polarities of all the circuit elements and power supplies can be reversed if desired. With respect to FIG. 1 it should be noted that the gate circuit 50 may be omitted and the function generator 18 will still function properly. In addition, as previously described the non-linear element 32 and the voltage inverter 40 may be omitted. A reference voltage source 48 independent of any current flowing in the protected circuit can be used as a reference including a battery. It should also be understood that the disclosed protective circuit is not limited to a maximum of four non-linear elements as shown in FIG. 1 but can be expanded to include more non-linear and modulating elements, therefore creating a function generator with an inverse time delay substantially proportional to a correspondingly higher power of the overload current in the protected circuit. It should also be understood that other devices having the necessary characteristics may be substituted for the Zener diodes in the non-linear element.

The apparatus embodying this invention has several advantages: It provides finer or more precise control of a time delay function generator particularly in the very low overload current range. It also provides a way for generating time delays that are substantially proportional to non-integral or intermediate powers of the magnitude of overload current flowing in the protected circuit. It also have the advantage of creating a function generator which can create an inverse time-current relationship that is substantially proportional to a higher power than a $I^2t = k$ or second power time-current relationship.

I claim as my invention:

1. A circuit breaker comprising separable main contacts capable of interrupting a protected circuit, a circuit breaker tripping means and a function generator for actuating said circuit breaker tripping means, said function generator comprising an input signal conditioning means having output terminals and adapted to be connected to said circuit, said signal conditioning means being capable of sensing an overload current in said protected circuit and producing an output voltage signal at said output terminals substantially proportional to the magnitude of said overload current, a plurality of N non-linear elements connected in circuit relationship with said output terminals, each of said non-linear elements being capable of producing an output current signal which is substantially proportional to said output voltage signal only when the magnitude of said output voltage signal is less than a predetermined value, a plurality of N modulating means, each of said modulating means being connected in circuit relationship with one of said non-linear elements with the output current signal of the associated non-linear element acting as an input signal for each of said modulating means to actuate each said modulating means to produce a modulated output signal which is substantially proportional to said input signal, each of said modulating means being interconnected with the other said modulating means in series circuit relationship with the modulated output signal from a first of said modulating means being applied as an additional input signal to the following modulating means, each of said modulating means following the first of said modulating means being connected to additionally modulate the previously modulated output signal it receives from the preceding modulating means in substantial proportion to the output current signal of the associated non-linear element, the last of said modulating means in said series circuit being connected to provide a final output charging electrical current signal which is substantially proportional to the Nth power of the magnitude of said overload current where N equals the number of non-linear elements whose output current signal is substantially proportional to the said output voltage signal of said input signal conditioning means when the said output voltage signal is less than said predetermined values associated with each of the respective non-linear elements, a triggering means having input and output terminals and a predetermined reference triggering potential associated therewith, and a capacitor, said capacitor and said input terminals of said triggering means being connected in circuit relationship with said last modulating means, the voltage across said capacitor increasing at a rate which is substantially proportional to the value of said charging current signal from said last modulating means, said voltage across said capacitor actuating said triggering means to produce a triggering signal when said voltage potential substantially equals said predetermined reference triggering potential, said output terminals of said triggering means being connected in circuit relationship with said circuit breaker tripping means to actuate said tripping means when said triggering signal is produced to thereby open said main contacts of said circuit breaker and interrupt said protected circuit.

2. A circuit breaker control system as in claim 1, wherein N, the number of non-linear elements, and the number of said modulating means equals three, said non-linear elements being connected generally in parallel circuit relationship with said output voltage signal, said first modulating means comprising a variable frequency oscillator for producing a modulated output current signal in the form of a pulse train comprising pulses of substantially predetermined width and amplitude and of a frequency which is substantially proportional to said output voltage signal, a second of said modulating means comprising a delay multivibrator for producing a modulated output current signal in the form of a pulse train comprising pulses of substantially predetermined frequency and amplitude and a width which is substantially proportional to said output voltage signal, and said last modulating means comprising a current amplifier for producing a modulated output current signal in the form of a pulse train comprising pulses of substantially predetermined frequency and width and an amplitude which is substantially proportional to said output voltage signal.

3. The combination as claimed in claim 1, wherein an additional modulating means, a reference voltage generator means and an additional non-linear element having an output terminal are connected in circuit relationship, said additional modulating means being connected to the output terminal of said additional non-linear element, the input terminal of said reference voltage generator means being connected to the output terminal of said additional modulating means, said additional modulating means producing an output voltage substantially proportional to said overload current, said triggering means having additional input terminals, the output of said reference voltage generator means being connected to said additional input terminals of said triggering means for varying said reference triggering potential substantially in proportion to the magnitude of overload current in the protected circuit causing said charging current signal to be substantially proportional to the Nth power of the magnitude of the overload current in the protected circuit.

4. The combination as claimed in claim 3, wherein a gating means having input and output terminals is connected with its output terminals connected generally in parallel circuit relationship with said capacitor, said gating means being actuable between first and second operating states, the first of said states generally providing a significantly lower impedance path in parallel with said capacitor for said charging current signal than that of said capacitor, the second of said states providing a significantly higher impedance path for said charging current signal in parallel with said capacitor than that of said capacitor, said input terminals of said gating means being connected to said output terminals of said input signal conditioning means to actuate said gating circuit from said first state to said second state when the magnitude of said overload current exceeds a predetermined value.

5. The combination as claimed in claim 2, wherein said three modulating means are connected with said pulse train from said oscillator applied as an input signal to said delay multivibrator, said pulse train from said delay multivibrator being applied as an input signal to said amplifier, said amplifier output current signal providing said charging current signal.

6. The combination as claimed in claim 2 wherein each of said modulating means may be connected interchangeably.

7. The combination as claimed in claim 4 wherein each of said non-linear elements may be actuated at substantially the same value of overload current.

8. The combination as claimed in claim 4 wherein said non-linear elements may be actuated by different values of overload current.

9. A function generator comprising an input signal conditioning means having output terminals and being adapted to be connected to an associated circuit, said signal conditioning means being capable of sensing current in said circuit and producing an output voltage signal at said output terminals substantially proportional to the magnitude of said current, a plurality of N non-linear elements connected in circuit relationship with said output terminals, each of said non-linear elements being capable of producing an output current signal which is substantially proportional to said output voltage signal only when the magnitude of said output voltage signal is less than a predetermined value, a plurality of N modulating means, each of said modulating means being connected in circuit relationship with one of said non-linear elements with the output current signal of the associated non-linear element acting as an input signal for each of said modulating means to actuate each said modulating means to produce a modulated output signal which is substantially proportional to said input signal which is substantially proportional to said input signal, each of said modulating means being interconnected with the other of said modulating means in series circuit relationship with the modulated output signal from a first of said modulating means being applied as an additional input signal to a following modulating means, each of said modulating means following the first of said modulating means being connected to additionally modulate the previously modulated output signal it receives from the preceding modulating means in substantial proportion to the output current signal of the associated non-linear element, the last of said modulating means in said series circuit being connected to provide a final output charging electrical current signal which is substantially proportional to the Nth power of the magnitude of said current where N equals the number of non-linear elements whose output current signal is substantially proportional to the said output voltage signal of said input signal conditioning means when the said output voltage signal is less than said predetermined values associated with the respective non-linear elements, a triggering means having input and output terminals and a predetermined reference triggering potential associated therewith, and a capacitor, said capacitor and said input terminals of said triggering means being connected in circuit relationship with said last modulating means, the voltage across said capacitor increasing at a rate which is substantially proportional to the value of said charging current signal from said last modulating means, said voltage across said capacitor actuating said triggering means to produce a signal when said voltage potential substantially equals said predetermined reference triggering potential.

10. The combination as claimed in claim 9, wherein N, the number of non-linear elements, and the number of said modulating means equals three, said non-linear elements being connected generally in parallel circuit relationship with said output voltage signal, said first modulating means comprising a variable frequency oscillator for producing a modulated output current signal in the form of a pulse train comprising pulses of substantially predetermined width and amplitude and of a frequency which is substantially proportional to said output voltage signal, a second of said modulating means comprising a delay multivibrator for producing a modulated output current signal in the form of a pulse train comprising pulses of substantially predetermined frequency and amplitude and a width which is substantially proportional to said output voltage signal, and said last modulating means comprising a current amplifier for producing a modulated output current signal in the form of a pulse train comprising pulses of substantially predetermined frequency and width and an amplitude which is substantially proportional to said output voltage signal.

11. The combination as claimed in claim 9, wherein an additional modulating means, a reference voltage generator means and an additional non-linear element having an output terminal are connected in circuit relationship, said additional modulating means being connected to the output terminal of said additional non-linear element, the input terminal of said reference voltage generator means being connected to the output terminal of said additional modulating means, said additional modulating means producing an output voltage substantially proportional to said current, said triggering means having additional input terminals, the output of said reference voltage generator means being connected to said additional input terminals of said triggering means for varying said reference triggering potential substantially in proportion to the magnitude of overload current in the protected circuit causing said charging current signal to be substantially proportional to the Nth power of the magnitude of the overload current in the protected circuit.

12. The combination as claimed in claim 11, wherein a gating means with input and output terminals is connected with its output terminals connected generally in parallel circuit relationship with said capacitor, said gating means being actuable between first and second operating states, the first of said states generally providing a significantly lower impedance path in parallel with said capacitor for said charging current signal than that of said capacitor, the second of said states providing a significantly higher impedance path for said charging current signal in parallel with said capacitor than that of said capacitor, said input terminals of said gating means being connected to said output terminals to said input signal conditioning means to actuate said gating circuit from said first state to said second state when the magnitude of said overload current exceeds a predetermined value.

13. The combination as claimed in claim 10, wherein said three modulating means are connected with said pulse train from said oscillator applied as an input signal for said delay multivibrator, said pulse train from said delay multivibrator being applied as an input signal for said amplifier, said amplifier output current signal providing said charging current signal.

14. The combination as claimed in claim 10 wherein said modulating means may be connected interchangeably.

15. The combination as claimed in claim 12 wherein said non-linear elements may be actuated at substantially the same value of current.

16. The combination as claimed in claim 12 wherein said non-linear elements may be actuated at different values of current.

* * * * *